United States Patent
Surinya et al.

(10) Patent No.: US 10,131,075 B2
(45) Date of Patent: Nov. 20, 2018

(54) POLYURETHANE COLD CAST PROTECTIVE SKINS FORMED AROUND AND INTEGRATED ONTO EXISTING HAND-HELD COMPUTING DEVICES

(71) Applicant: Aegex Technologies, LLC, Atlanta, GA (US)

(72) Inventors: Endre Surinya, Pecs (HU); Helga T. Laborci, Pecs (HU); László Molnár, Balatonboglár (HU)

(73) Assignee: Aegex Technologies, LLC, Atlanta, GA (US)

( * ) Notice: Subject to any disclaimer, the term of this patent is extended or adjusted under 35 U.S.C. 154(b) by 0 days.

(21) Appl. No.: 15/488,425

(22) Filed: Apr. 14, 2017

(65) Prior Publication Data
US 2018/0029257 A1    Feb. 1, 2018

Related U.S. Application Data

(60) Provisional application No. 62/322,239, filed on Apr. 14, 2016.

(51) Int. Cl.
| | |
|---|---|
| *B29C 39/00* | (2006.01) |
| *H04B 1/3888* | (2015.01) |
| *B29C 39/02* | (2006.01) |
| *B29C 35/02* | (2006.01) |
| *B29C 65/48* | (2006.01) |
| *B29C 39/10* | (2006.01) |
| *B29K 75/00* | (2006.01) |
| *B29L 31/34* | (2006.01) |

(52) U.S. Cl.
CPC ............ *B29C 39/003* (2013.01); *B29C 35/02* (2013.01); *B29C 39/00* (2013.01); *B29C 39/02* (2013.01); *B29C 39/10* (2013.01); *B29C 65/48* (2013.01); *H04B 1/3888* (2013.01); *B29K 2075/00* (2013.01); *B29L 2031/3481* (2013.01)

(58) Field of Classification Search
CPC ....... B29C 39/003; B29C 35/02; B29C 65/48; B29C 39/02; H04B 1/3888; B29K 2075/00; B29L 2031/3481
USPC ........................................................ 156/245
See application file for complete search history.

(56) References Cited

U.S. PATENT DOCUMENTS

| | | | |
|---|---|---|---|
| 2008/0093017 A1* | 4/2008 | Young | B29C 39/023 156/242 |
| 2011/0024031 A1* | 2/2011 | Varner | B29C 41/06 156/245 |

(Continued)

*Primary Examiner* — Philip C Tucker
*Assistant Examiner* — Vicki Wu
(74) *Attorney, Agent, or Firm* — Todd Partners, P.C.; Jack D. Todd

(57) ABSTRACT

A system and method for bonding a protective cover to a mobile device is disclosed. A cold cast protective cover is permanently bonded to the device and provides protection against damage from dropping, impact, exposure to electric or static discharge, and exposure to liquid, gas, and dusts. The cold cast protective cover takes the shape around all or some desired portion of the outer surface of the mobile device while still providing access to the device's user interface, including display, power and volume buttons, power charging port, memory port, speaker port, camera lens, and the like. The cold cast protective cover can, with additives, increase the safety of the device for Intrinsic Safety or Hazardous environments.

1 Claim, 6 Drawing Sheets

Protective cover and battery door molds

(56) References Cited

U.S. PATENT DOCUMENTS

2013/0026678 A1\* 1/2013 Qin .................. B29C 45/14778
264/259
2015/0124401 A1\* 5/2015 Prest ...................... C22C 1/002
361/679.55

\* cited by examiner

Typical Protective cover Installation process

Protective Cover comparision

Protective cover and battery door molds

Protective Cover Cold Cast process

Preparing device for Cold Cast process

POLYURETHANE COLD CAST PROTECTIVE SKINS FORMED AROUND AND INTEGRATED ONTO EXISTING HAND-HELD COMPUTING DEVICES

CROSS REFERENCE TO RELATED APPLICATIONS

This patent application claims priority benefit under 35 U.S.C. § 119(e) to U.S. Prov. Pat. Appl. No. 62/322,239, entitled "Polyurethane Cold Cast Protective Skins Formed Around and Integrated Onto Existing Hand-held Computing Device," filed Apr. 14, 2016, which is incorporated herein by reference in its entirety.

FIELD OF THE INVENTION

The present invention relates generally to cold cast molding techniques and applications and, more specifically, to processes used to design and form a single-body, polyurethane cold cast protective cover or skin around a hand-held computing device, such as a mobile device or tablet, preferably for use in a hazardous, industrial, extreme sport, agricultural, or potentially explosive environment.

BACKGROUND OF THE INVENTION

Modern communications equipment, such as computing devices, smartphones, portable tablets, hand-held devices, laptops, mobile devices (hereinafter "devices" or "mobile devices"), often require physical protection for use in normal, industrial, extreme sport, agricultural, hazardous, and potentially explosive environments to help protect the device against drops, impacts, and exposure to water, gas, and dust. Today, there are many different types of after-market protective covers that can be attached to such mobile devices that provide some level of protection. Typically, conventional protective covers enable a user to add and remove an after-market cover to the device. After-market covers come with a wide range of protective features, ease or difficulty of insertion, and within a wide price range. The insertion process typically consists of separating the protective after-market cover into two or more sections, inserting the device into a first section of the protective cover, and then enclosing the device by attaching the other section(s) to the first section to form a protective cover or skin around the device. There are some single-body protective covers in the market that do not come in multiple pieces, but such single-body covers need to be flexible enough to enable the device to be inserted therein.

Further, each after-market protective cover is necessarily designed and sold to fit a specific device form factor. For example, though the Apple iPhone® and the Samsung Galaxy® are both smartphones, the iPhone® protective cover will not fit a Samsung®. In addition, the size and shape of such smartphones typically change every year or two as newer models are introduced into the marketplace. In addition, after-market protective covers typically lose their shape and cause the protective cover to offer less protection than at the original time of purchase, especially if the cover includes a rubber or flexible portion that is disposed inside or outside of a harder housing shell—and even more so if the protective cover is designed to be removable.

Today, it is possible for a manufacturer to bond or fuse an additional protective cover or further housing layer to a device, but it typically requires the protective cover to be manufactured and adhered to the device during the manufacturing process. Typically, the device manufacturer will run a separate production line for a specified number of devices that the manufacturer wants to sell with a ruggedized outer housing. Such a ruggedized protective cover requires melting a protective compound onto the device outer shell when the housing is being created in the first place and before sensitive electronic components are installed within the housing. Such process typically requires high temperature to melt and bond the protective cover to the target device outer shell. This process requires special molding forms that can withstand high temperature. The protective cover is melted onto the target device's outer shell.

There is thus a need in the industry for being able to provide and create a non-removable protective cover or skin to an after-market device. Further limitations and disadvantages of conventional systems and further needs and solutions provided by the processes, systems, and products disclosed herein will become apparent to one of skill in the art after reviewing the remainder of the present application with reference to the drawings, claims, and detailed description that follow.

SUMMARY OF THE INVENTION

The present invention relates generally to cold cast molding techniques and applications and, more specifically, to systems and processes used to design and form a single-body, polyurethane cold cast protective cover or skin around a hand-held computing device, such as a mobile device or tablet, preferably for use in a hazardous, industrial, extreme sport, agricultural, or potentially explosive environment. The cold cast protective cover is fused to and integrated with all or some portion of the outer surface of the computing device in a non-removable manner to protect the device against damage from being dropped, exposed to liquid and dust ingress, and other harsh or rugged usage. The cold cast protective cover is adhered to the device using a polyurethane, cold casting process, which ensures a strong and non-removable cover or protective skin. Additives may be added to the polyurethane during the cold casting process to provide desired end product characteristics, such as color, texture, weight, thickness, impact strength, flexibility, reduced permeability to liquids, solids, and gases, reduced conductivity or resistance to electrostatic discharge, and the like.

In practice, the present technology may be conceptualized as a protective cover composed of but not limited to a polyurethane type compound and to related processes and systems for creating and forming the same. The cold cast protective compound may require additives for, but not limited to, color pigmentation, mildew prevention, or anti-static. Using the provided mixing direction, the compound is mixed to the appropriate texture and then, using a cold cast process, the compound is physically cold casted and fused to a device in order to create a cold cast protective cover. The cold cast protective cover adheres to the device form factor and ensures that all interfaces are accessible and protected. Once the cold cast protective cover is fused to the device, the cold cast protective cover is not designed to be removed without destruction and will not deform.

These and other aspects, features and advantages of the present technology will be understood with reference to the drawings and detailed description contained herein, and will be realized by means of the various elements and combinations particularly pointed out in the appended claims filed herewith, in any subsequent amendment to this application, and in any related non-provisional patent applications filed hereinafter that claim priority benefit to this application. It is to be understood that both the foregoing general description and the following brief description of the drawings and detailed description of the present technology are exemplary and explanatory of preferred embodiments of the invention, and are not intended to be restrictive of the invention, as ultimately claimed.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there is shown in the drawings example constructions of the embodiments; however, the embodiments are not limited to the specific methods and instrumentalities disclosed. In addition, further features and benefits of the present technology will be apparent from a detailed description of preferred embodiments thereof taken in conjunction with the following drawings, wherein similar elements are referred to with similar reference numbers, and wherein.

DETAILED DESCRIPTION OF PREFERRED EMBODIMENTS

Figure 1:
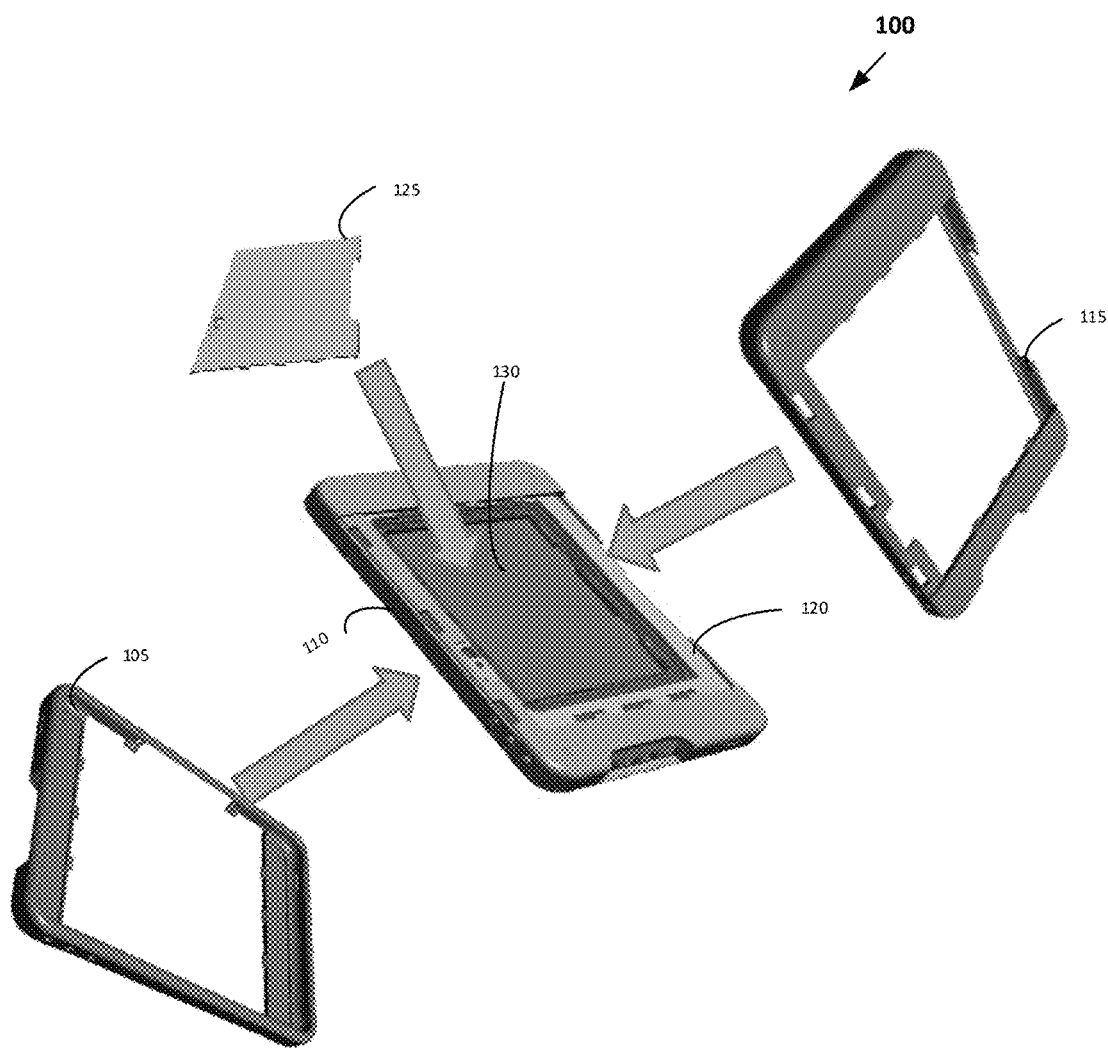
FIG. 1 is a diagram illustrating an example of the typical installation of an off the shelf aftermarket protective cover mobile device.

The exemplary systems and methods for a cold cast protective cover for mobile devices provide one or more of the following benefits, including, but not limited to: (1) a higher level of protection for the device against damage due to being dropped or misused; (2) the device has a higher level of ingress protection against foreign liquid and or dust type of particle; (3) where appropriate, the device can be used in a hazardous or dangerous environment because the cold cast protective cover cannot removed; (4) the cold cast process ensures a better fit to the device while protecting the device; and (5) stronger durability and life for the device and the protective cover.

Users have come to understand the value of a smartphone that has the ability to run a myriad of software applications, manage email, and enable other daily tasks that have become a necessary and expected component of daily work. This familiarity with such smartphones must translate to any type of mobile device that is issued to a user on the job. Ideally, the device must be of smaller or similar size, weight and performance as the one used off the job site and that is familiar to the user.

Specifically, with respect to smartphone performance and certifications, there are a broad range of certifications and standards that have been established to maintain performance, network conformity, and usability. These include, but are not limited to, IC, PTCRB, GCF (including field trials), R&TTE, CE, FCC, and many more.

With respect to safety certification, one of the most commonly used concepts for low power equipment (such as mobile devices) is "Intrinsic Safety" and "Ingress Protection." Protective covers for mobile devices are sometime used to address Ingress Protection. This disclosure will specifically address design concepts for obtaining the appropriate level of protection for a wide range of possible hazards.

Protective covers are typically designed to protect a mobile device in a normal environment and from harsh or rugged usage. The theory behind protective covers is to ensure that the mobile device is protected when it is physically dropped or impacted or otherwise exposed to liquids, gas, or foreign particles such as but not limited to dust or explosive filings. As part of the theory, the protective cover ensures the mobile device survive physical drops, water and dust ingress, and continues to function.

Protective covers can be certified for the level of protection the cover provides. The IEC Ex 60529 standard defines different level of protections and the process to determine the level of protection a product provides. The IEC Ex 60529 is also known as the Ingress Protection (IP) Rating and is sometimes also referred to as the International Protection (IP) rating. IEC Ex 60529 provides the guidelines and requirements for testing the level of protection attained by a piece of equipment against ingress of solid bodies and/or liquids. The IEC Ex 60529 standard requires a device to withstand physical drops of 1 meter. The test requires that the device be dropped 6 times on each corner, on the face, and its back. Additionally, the IEC Ex 60529 requires the device to be protected against water and dust ingress.

The IP rating code consists of the letters "IP" followed by two digits. The IP code classifies and rates the degrees of protection the device has against intrusion of solid and liquid objects and accidental contact with an enclosure. The first digit indicates the level of protection that the device provides against solid foreign objects, such as but not limited to dust or powder. The second digit provides the level of protection the device provides against liquid, such as but not limited to, water or oil.

More specifically, the first digit of the IP rating code ranges from 0-6, with 0 meaning "no protection," 1 meaning "protected against solid objects over 50 mm (e.g. accidental touch by hands)," 2 meaning "protected against solid objects over 12 mm (e.g. fingers)," 3 meaning "protected against solid objects over 2.5 mm (e.g. tools and wires)," 4 meaning "protected against solid objects over 1.0 mm (e.g. tools, wires, and small wires)," 5 meaning "protected against dust limited ingress (no harmful deposit)," and 6 meaning "totally protected against dust)." Additionally, the second digit of the IP rating code ranges from 0-8, with 0 meaning "no protection," 1 meaning "protected against vertically falling drops of water," 2 meaning "protected against direct sprays up to 15 degrees from the vertical," 3 meaning "protected against direct sprays up to 60 degrees from the vertical," 4 meaning "protected against sprays from all directions limited ingress permitted," 5 meaning "protected against low pressure jets of water from all directions—limited ingress permitted," 6 meaning "protected against strong jets of water (e.g. for use on shipdecks—limited ingress permitted)," 7 meaning "protected against the effects of temporary immersion between 15 cm and 1 m; duration of test 30 minutes," and 8 meaning "protected against long periods of immersion under pressure."

Referring now to the drawings, FIG. 1 illustrates a conventional, prior art protective cover 100 in the process of being installed onto and about a device. A commercially-available protective cover may consist of two or more housing components, which the user must break down into separate sections prior to start of the installation. As shown in FIG. 1, this particular conventional, multi-component protective cover includes three sections: a front protective section 105, a back protective section 115, and a battery door protective section 120.

The exemplary installation process consists of breaking down the aftermarket protective cover into its separate sections. Once the protective cover is separated into sections, the protective cover front section 105 is inserted on the mobile device front face 110. The mobile device's front face is considered to have the screen. The protective cover back section 115 is put onto the back of the mobile device 120. The protective cover front section 105 and back section 115 are joined together via a locking mechanism and, when engaged in locking manner, cover the mobile device. In this example a protective battery door section 125 protects the battery cavity 130 and is inserted into the protective cover back segment 115. The end result is a target device that is now protected with a removable protective cover that may or may not fit very well on the mobile device.

Figure 2:
FIG. 2 is a set of diagram illustrating a cold cast protected device versus an aftermarket protective covered device.

The diagrams in FIG. 2 depict a cold casted protected after-market device 200 in contrast with the conventional protected device shown in FIG. 1. The cold casted protected after-market device 200 includes a front cover 205, in which the cold cast protective cover contours the display and is an integral part of the device. The back cover 210 is fully fused to the device and includes a battery cavity and door that is fully covered with the cold cast protective cover.

FIG. 2 also illustrates a front 215 of an after-market protected device in which the protective cover is sectionalized and is joined together using snap tabs or screws but not fused. FIG. 2 also illustrates a back 220 of an aftermarket protected device in which the protective cover is sectionalized and is joined together using snap tabs or screws but not fused.

Figure 3:
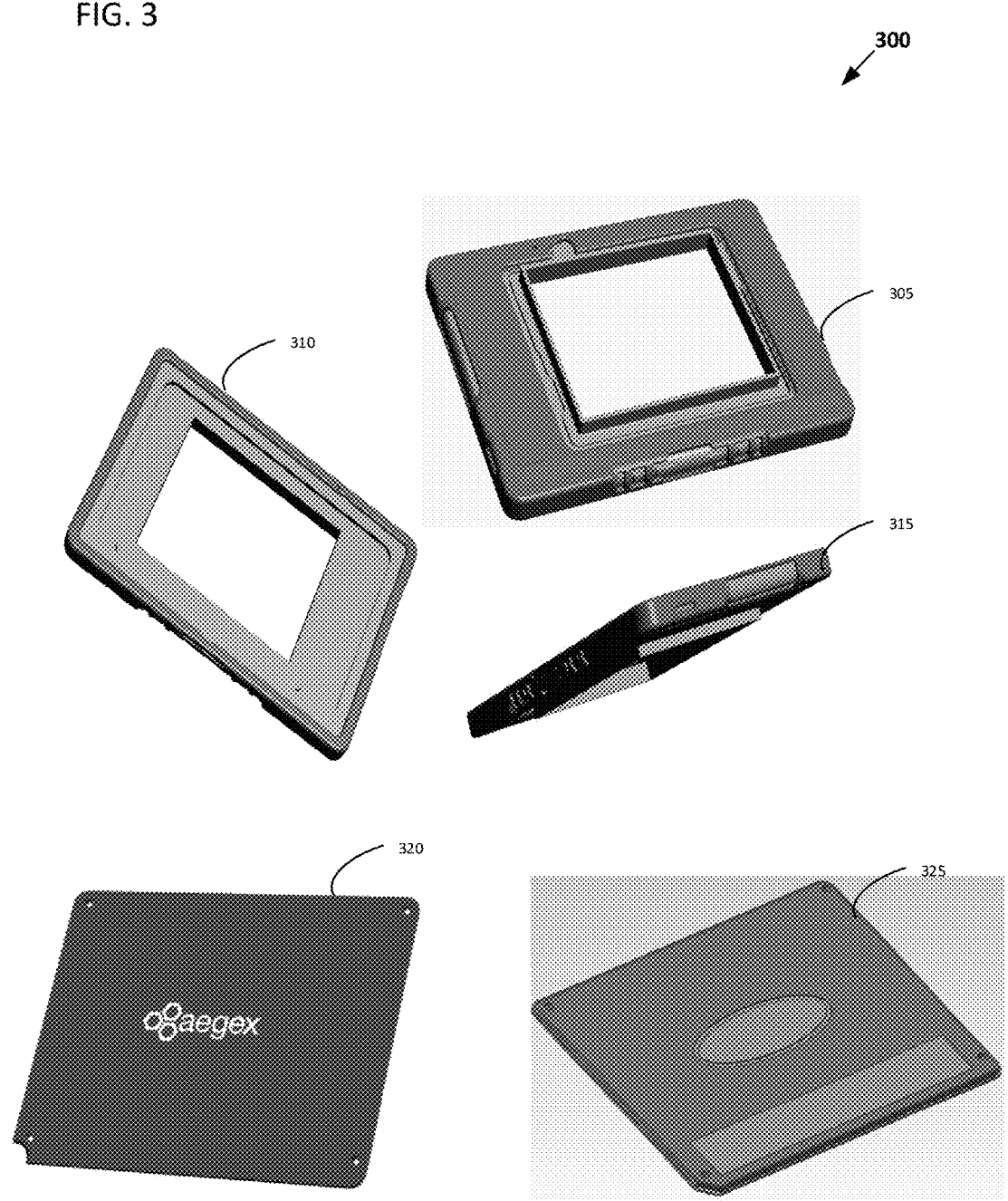
FIG. 3 is a diagram illustrating an example of a protective cover mold used in the process of creating the cold cast protective cover.

A preferred protective cover mold and battery door mold 300 is depicted in FIG. 3. To create the cold cast protective cover, there are numerous challenges to bonding a protective cover to a device, such as but not limited to: (1) ensuring a good understanding of the raw protective compound thermal and curing requirements and characteristics; (2) ensuring that the device is not overheated or damaged during the process; (3) ensuring that the compound is consistently fused and adhere to the device; (4) ensuring that the cold cast protective cover has good elasticity and usability; and (5) ensuring that the protective compound only bonds to the device and not to the mold.

The exemplary protective cover mold and battery door mold 300 includes a single frame front 305, back 310, and sides 315. The protective cover mold preferably has the same outside dimensions and form factor as the target device being covered and is shaped to ensure that all of the openings, speaker, microphone and buttons of the device are accurately located and protected. The protective cover mold may be assembled in multiple sections. As shown, for example, the battery doors 320 and 325 are separately molded. The protective cover and battery door mold may provide company or application specific implements such as but not limited to company logo, texturize area, and latch access.

The exemplary protective cover mold and battery door mold 300 are used to create a device cavity. This device cavity may be made from but not limited to silicone, metal, or ceramic. The primary purpose of the protective cover and battery door cavities is to provide the necessary infrastructure to cold cast the protective material onto the target device. The device cavity is used during the cold cast process, where the target device is inserted into the device cavity. Once the target device is inserted in the device cavity, the device cavity provides the necessary spacing between the target device and itself to ensure the proper thickness of the protective compound. The device cavity prevents the protective compound from entering interfaces and portholes of the target device, and provides injection and exhaust portholes used during the cold cast process. The device cavity ensures the protective compound only fuses to the target device outer shell and protects the target device interface portholes. The protective compound preferably is made from a polyurethane.

Figure 4:
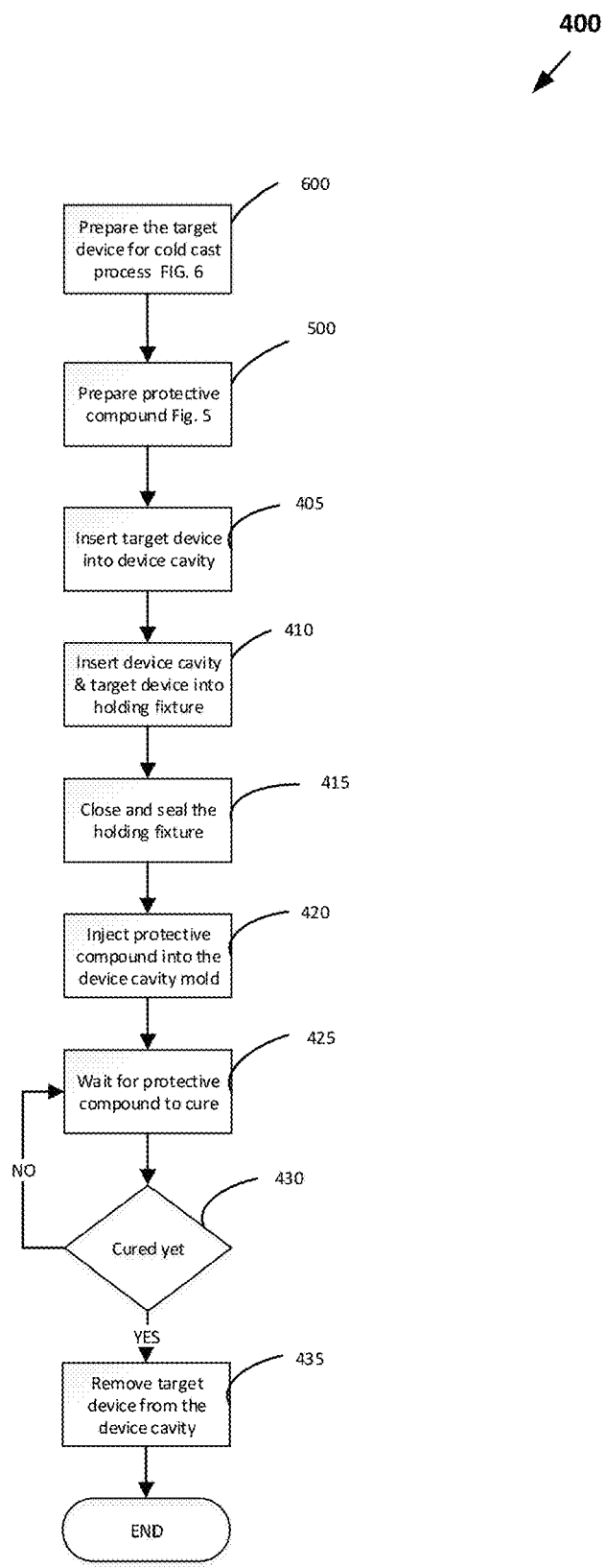
FIG. 4 depicts an exemplary flow diagram describing the flow to cold cast and fuse the protective cover to the mobile device.

The protective cover cold cast process 400 is illustrated in the flow diagram of FIG. 4, which depicts the cold cast process and associated support process. FIG. 4 starts with the preparation of the target device using the exemplary process 600 described in greater detail in association with FIG. 6. The next step requires the protective compound to be prepared using the exemplary process 500 described in FIG. 5.

Each device cavity may be used multiple times; however, before each use, it is necessary to verify that the device cavity is still in usable condition. If not, a new device cavity must be created. It is also important to prepare the target device for processing prior to preparing the protective compound because the protective compound may have a short curing time.

Once all of the initial preparations are completed, the target device is inserted into the device cavity 405. The device cavity provides the correct form factor and protects the target device's interface openings, buttons, speaker, microphone and other critical areas where it is not necessary to have the protective compound.

The device cavity and target device are then inserted into a holding fixture 410. The holding fixture seals the device cavity about the target device 415. The holding fixture seal provides the necessary setting to provide the optimum protective compound injection and prevent defects such as but not limited bubbles, dirt, or imperfection. The protective compound is then injected 420 using an injection orifice located in the device cavity. Excess air and compound escape via an air exhaust orifice. The device cavity injection orifice enables the protective compound to penetrate between the target device and the device cavity. The device cavity provides the necessary pressure and seal so the protective compound adheres to the target device.

Conventional injection processes require a compound to be heated and molded, which can damage conventional mobile devices that are already manufactured and contain sensitive electronic components. In contrast, the cold cast process only requires injecting a low temperature liquid compound that is designed to fuse to a target device. The cold cast process may consist of injecting a low temperature liquid compound with a calculated pressure, which enables the fusing of the liquid compound to the target device. The configuration of the device cavity with the target device provides the necessary pressure and balance for the compound to fuse to the target device without damaging the target device.

Once the protective compound is injected, it is necessary to wait 425 for the protective compound to cure and adhere to the target device. The cure time may be shortened by adding accelerating compound to the protective compound. Adding accelerating compound to the protective compound may modify the protective compound's durability. At the end of the wait time, the device cavity and target device are removed from the holding fixture and the target device is removed 440 from the device cavity. The cold cast process is completed and the target device is covered with a cold cast protective cover, which is now an integral part of the target device.

Figure 5:
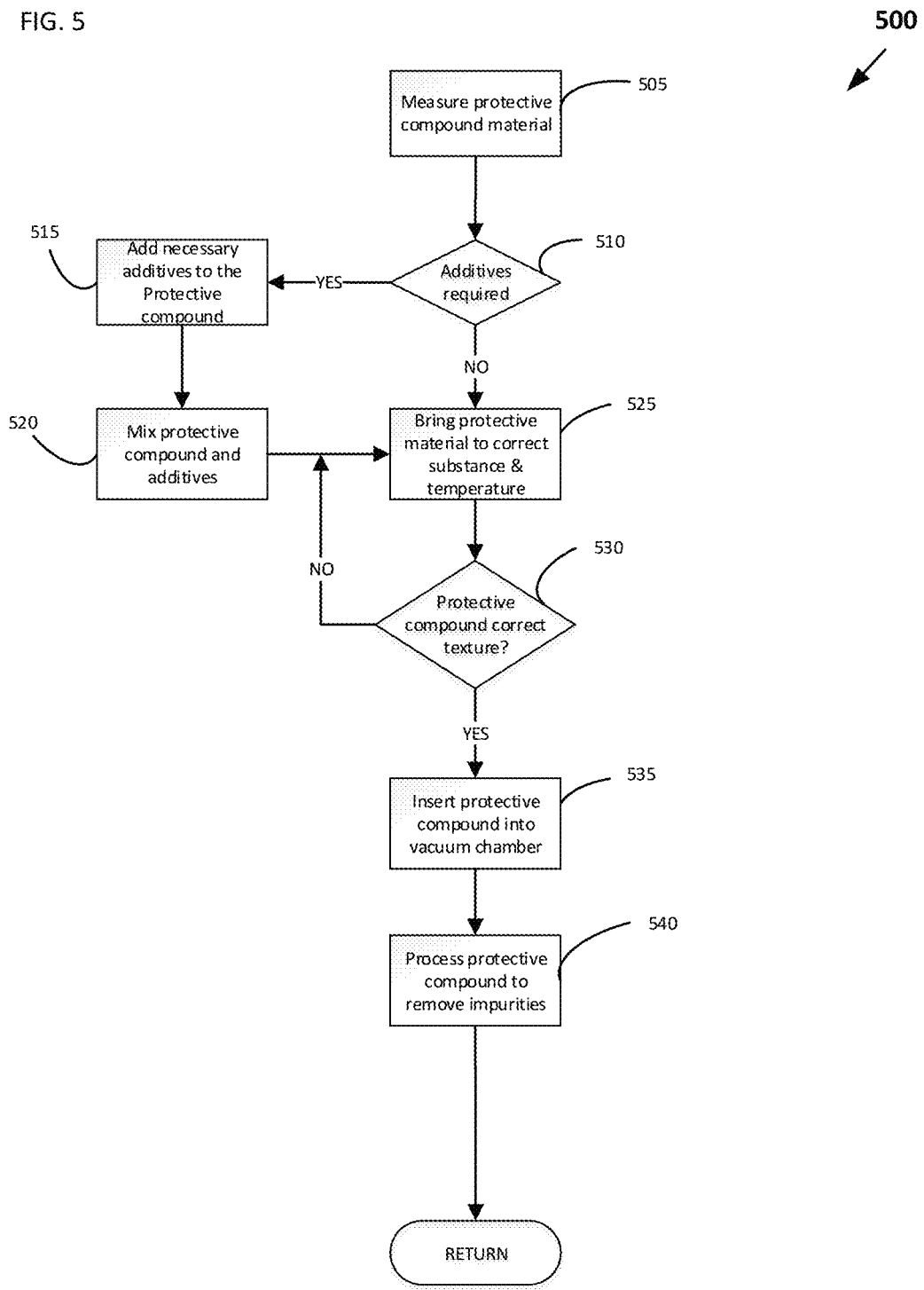
FIG. 5 depicts an exemplary flow diagram describing an exemplary process to prepare the protective compound.

The preparation of the protective compound 500 is depicted in FIG. 5. Preferably, the process 500 starts by measuring 505 the protective compound material. Such material is preferably a polyurethane, such as but not limited to Smooth-On polyurethane PMC780, or Smooth-On Polyurethane Smooth-Cast 45D, or other such similar low temperature compound or custom compounds that consists of a two-part mixture in which part A and part B are mixed for a predetermined time. Once the two parts are mixed, additives may be included as well—depending on the desired features and characteristics needed for the protective cover and the intended use of the target device.

If additives are required 510, such additives are added 515 to the protective compound. Additives may include but are not limited to mildew prevention, color pigmentation, curing accelerator, and anti-static features. It is necessary to use accurate measurement based on the protective compound and additives technical specifications may define to ensure consistency and proper outcome. Technical specifications may also define the temperature, humidity, pressure, and other limitations for use. The additives are added and mixed 520 with the protective compound. The protective compound and additives are mixed 525 for a specified duration to ensure correct substance and temperature based on the technical specification.

Once the protective compound is of correct substance and temperature 530, the protective compound is preferably inserted 535 into a vacuum chamber, if necessary, to remove any bubbles or air gaps. The vacuum is turned on and the bubbles and air gap are brought 540 to the surface of the protective compound. The vacuum eliminates the air gap and bubbles contained in the protective compound hence preventing bubbles and air gaps during the cold cast process depicted in 400. The protective compound is ready for the cold cast process.

Figure 6:
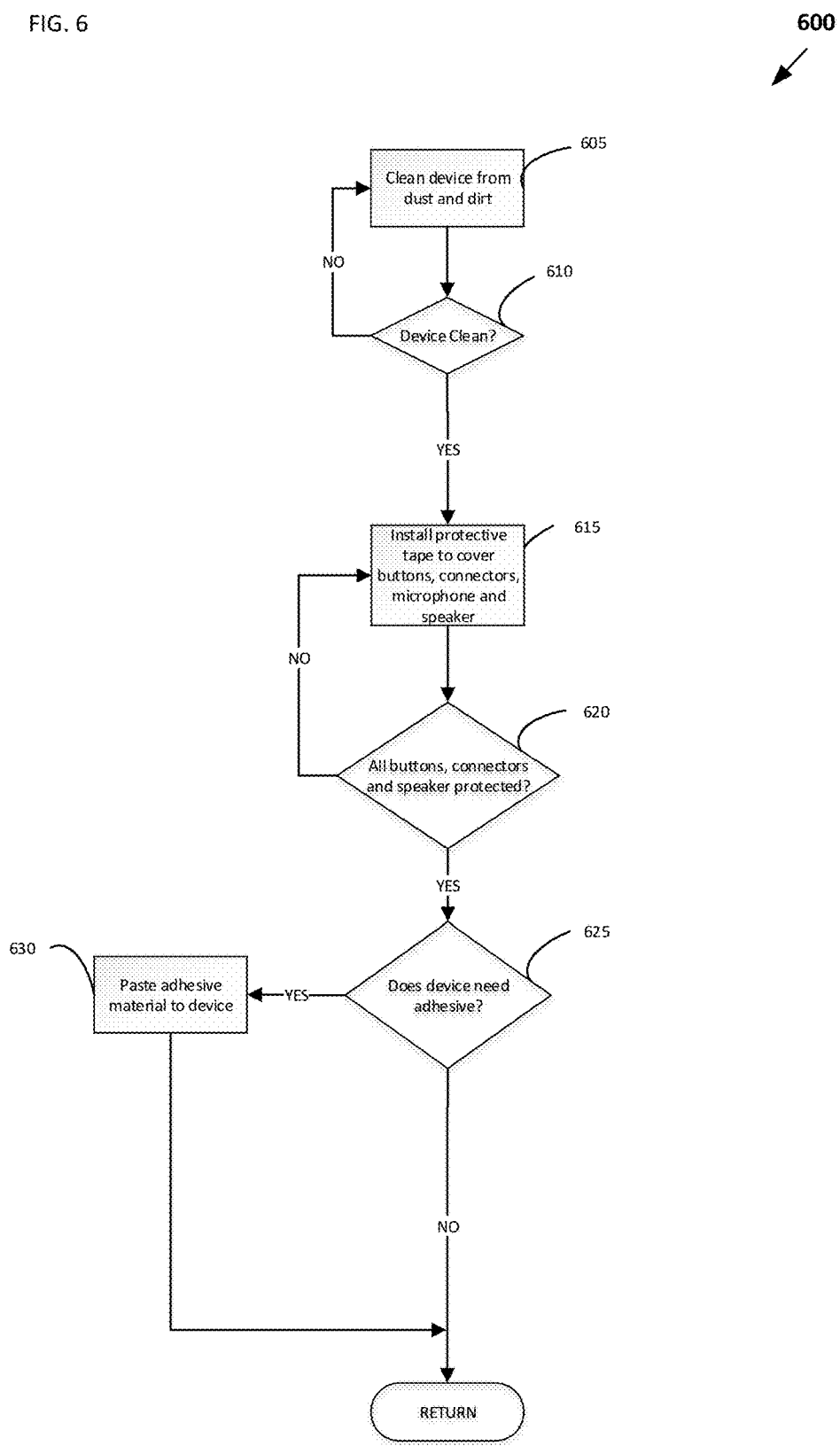
FIG. 6 provides an exemplary flow diagram describing the preparation of the device.

As stated above, the target device must be prepared prior to bonding the protective cover thereto. The preparation process 600 is illustrated in FIG. 6. The target device is first cleaned 605 using a cleaning compound such as but not limited to alcohol or ethanol. The target device is cleaned of dust, fingerprint, dirt, and the like. The cleaning is critical for the cold cast process to be successful.

After the device has been cleaned 610, the target device's parts, such as but not limited to buttons, speaker, microphone, camera, connectors and other areas where the protective compound could penetrate (such as but not limited to the bottom and top outer casing joining, battery chamber) are covered 615 to prevent protective compound damage. When all of the target device portholes and interfaces are covered to prevent exposure 620 to the protective compound, it is then determined 625 whether the target device requires additional adhesive characteristics. Some target device outer shell may require adhesive material to ensure that the protective compound fuses properly and permanently to the target device. The decision is based on the target device outer shell chemical composition and its ability to adhere to the protective compound. If the target device requires additional adhesive, an adhesive mixture is pasted 630 onto the target device. The adhesive mixture is preferably an epoxy glue, methacrylate adhesives, neoprene contact glue, or similar adhesive. Once the device outer shell is pasted 630 with an adhesive mixture, the target device is now ready for the bonding process described in the exemplary flow chart depicted in FIG. 4.

The data sheet for the preferred polyurethane composition used herein can be found at the following link (which was included in the provisional patent application incorporated by reference): http://www.smooth-on.com/Urethane-Plastic-a/c5_1120_1208/index.html. Preferably, 100 ml of polyurethane blend is used for a conventional-sized tablet device and 50 ml is used for the corresponding battery cover. In preferred embodiments, three (3) drops of UVO black is added for coloring purposes; however, any color additive can be added as desired. The following link provides information regarding this color additive (which was included in the provisional patent application incorporated by reference): http://www.smooth-on.com/index.php?cPath=1423. Additionally, there are any number of other additives that can be provided based on the desired characteristics of the polyurethane composition during the mold and curing process or based on desired features of the final end product. Preferably, for devices that may be used in hazardous environments, the following antistatic additive is added to the composition at a ratio of approximately 0.5%. A link to this additive is found at the following site (which was included in the provisional patent application incorporated by reference): http://www.repi.com, Antistatic Additive AEG-PCH-0005-01.

In view of the foregoing detailed description of preferred embodiments of the present invention, it readily will be understood by those persons skilled in the art that the present invention is susceptible to broad utility and application. While various aspects have been described herein, additional aspects, features, and methodologies of the present invention will be readily discernable therefrom. Many embodiments and adaptations of the present invention other than those herein described, as well as many variations, modifications, and equivalent arrangements and methodologies, will be apparent from or reasonably suggested by the present invention and the foregoing description thereof, without departing from the substance or scope of the present invention. Furthermore, any sequence(s) and/or temporal order of steps of various processes described and claimed herein are those considered to be the best mode contemplated for carrying out the present invention. It should also be understood that, although steps of various processes may be shown and described as being in a preferred sequence or temporal order, the steps of any such processes are not limited to being carried out in any particular sequence or order, absent a specific indication of such to achieve a particular intended result. In most cases, the steps of such processes may be carried out in various different sequences and orders, while still falling within the scope of the present inventions. In addition, some steps may be carried out simultaneously. Accordingly, while the present invention has been described herein in detail in relation to preferred embodiments, it is to be understood that this disclosure is only illustrative and exemplary of the present invention and is made merely for purposes of providing a full and enabling disclosure of the invention. The foregoing disclosure is not intended nor is to be construed to limit the present invention or otherwise to exclude any such other embodiments, adaptations, variations, modifications and equivalent arrangements, the present invention being limited only by the claims appended hereto and the equivalents thereof.

We claim:

1. A process for permanently and fixedly bonding a protective cover to an external surface of a mobile device, comprising:

providing an outer mold, the outer mold having an interior dimension that corresponds to an exterior surface of the mobile device, the mold configured to cover user interfaces and portholes of the mobile device and to define a desired size and shape for the protective cover;

forming a device cavity based on the outer mold, the device cavity conforming to the desired shape and size of for the protective cover, the device cavity having an injection orifice and an exhaust orifice;

inserting the mobile device into the device cavity;

thereafter, inserting the device cavity containing the mobile device into a holding fixture, the holding fixture sealing the device cavity about the mobile device;

injecting a polyurethane cold cast compound into the injection orifice of the device cavity until the device cavity is filled;

enabling excess air and excess polyurethane cold cast compound to escape via the exhaust orifice;

allowing the polyurethane cold cast compound within the device cavity to cure for a predetermined period of time;

after the predetermined period of time, removing the device cavity containing the mobile device from the holding fixture; and thereafter, removing the mobile device from the device cavity, wherein the cured polyurethane cold cast compound acts as the protective cover that is permanently and fixedly bonded to the external surface of the mobile device.

* * * * *